(12) United States Patent
Guo et al.

(10) Patent No.: US 8,081,681 B2
(45) Date of Patent: Dec. 20, 2011

(54) METHOD OF SCALABLE FRACTIONAL MOTION ESTIMATION FOR MULTIMEDIA CODING SYSTEM

(75) Inventors: Jiun-In Guo, Chia-Yi (TW);
Ching-Lung Su, Yunlin (TW); Yao Li, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 1115 days.

(21) Appl. No.: 11/812,243

(22) Filed: Jun. 15, 2007

(65) Prior Publication Data

US 2008/0298692 A1  Dec. 4, 2008

(30) Foreign Application Priority Data

Jun. 1, 2007  (TW) .............................. 96119659 A

(51) Int. Cl.
*H04N 7/50*  (2006.01)
(52) U.S. Cl. ................................. 375/240.17
(58) Field of Classification Search ............. 375/240.16, 375/240.17
See application file for complete search history.

(56) References Cited

U.S. PATENT DOCUMENTS

2006/0002474 A1* 1/2006 Au et al. .................. 375/240.16
2007/0217515 A1* 9/2007 Wang et al. ............. 375/240.17

OTHER PUBLICATIONS

Lee et al. "Variable block size motion estimation algorithm and its hardware architecture for H.264/AVC ," IEEE, pp. 741-744, May 2004.*
Chen et al. "Fast ingeter-pel and fractional-pel motion estimation for H.264/AVC," Science Direct, pp. 264-290.*
Chang et al. "A 7mW-to-183mW Dynamic Quality-Scalable H.264 Video Encoder Chip," IEEE, pp. 280-281, 603. Feb. 2007.*

* cited by examiner

*Primary Examiner* — Gilberto Barron, Jr.
*Assistant Examiner* — Virginia T Ho
(74) *Attorney, Agent, or Firm* — Jackson IPG PLLC; Demian K. Jackson

(57) ABSTRACT

A multimedia coding system has different picture qualities with different coding characteristics. It is done through a scaleable fractional motion estimation (FME) in H.264 and a block size trend prediction FME. Three quality levels are thus obtained. The first level processes a complete calculation and obtains a best picture; the second level, fewer calculation with a low power consumption and an acceptable picture quality; and the third level, fewest calculation with a fastest speed. And the present invention is suitable for hardware design to obtain a high efficiency, a low cost and a high performance.

5 Claims, 30 Drawing Sheets

| cycle | Current State | Next State | | Generated Candidate Point Address | | |
|---|---|---|---|---|---|---|
| | | | | MV Cost of nh/ph | MV Cost of nq/pq | MV Cost of i |
| 0 | IDLE | 1 | N/A | N/A | N/A | N/A |
| 1 | 1 | 2 | X Coordinate | X=-1/2 | X=-1/4 | X=0 |
| | | | Y Coordinate | Y=0 | Y=0 | Y=0 |
| 2 | 2 | 3 | X Coordinate | X=+1/2 | X=+1/4 | X=0 |
| | | | Y Coordinate | Y=0 | Y=0 | Y=0 |
| 3 | 3 | 4 | X Coordinate | X=-1/2 | X=-1/4 | X=0 |
| | | | Y Coordinate | Y=-1/2 | Y=-1/2 | Y=-1/2 |
| 4 | 4 | 5 | X Coordinate | X=+1/2 | X=+1/4 | X=0 |
| | | | Y Coordinate | Y=-1/2 | Y=-1/2 | Y=-1/2 |
| 5 | 5 | 6 | X Coordinate | X=-1/2 | X=-1/4 | X=0 |
| | | | Y Coordinate | Y=-1/4 | Y=-1/4 | Y=-1/4 |
| 6 | 6 | 7 | X Coordinate | X=+1/2 | X=+1/4 | X=0 |
| | | | Y Coordinate | Y=-1/4 | Y=-1/4 | Y=-1/4 |
| 7 | 7 | 8 | X Coordinate | X=-1/2 | X=-1/4 | X=0 |
| | | | Y Coordinate | Y=+1/2 | Y=+1/2 | Y=+1/2 |
| 8 | 8 | 9 | X Coordinate | X=+1/2 | X=+1/4 | X=0 |
| | | | Y Coordinate | Y=+1/2 | Y=+1/2 | Y=+1/2 |
| 9 | 9 | 10 | X Coordinate | X=-1/2 | X=-1/4 | X=0 |
| | | | Y Coordinate | Y=+1/4 | Y=+1/4 | Y=+1/4 |
| 10 | 10 | IDLE | X Coordinate | X=+1/2 | X=+1/4 | X=0 |
| | | | Y Coordinate | Y=+1/4 | Y=+1/4 | Y=+1/4 |

FIG.6

| Valid Type | Input Pixels | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | | | | | | | | | | | | | | | | | | | | |
| 1 | | | | | | | | | | | | | | | | | | | | |
| 2 | | | | | | | | | | | | | | | | | | | | |
| 3 | | | | | | | | | | | | | | | | | | | | |

FIG.11

| Storage Device | Input Pixels Number(0 ~ 13) |
|---|---|
| Half Pixel Storage Device #0.5 | 0,1,2,3,4,5 |
| Integer Pixel Storage Device #1 | 3,4,5,6 |
| Half Pixel Storage Device #1.5 | 1,2,3,4,5,6 |
| Integer Pixel Storage Device #2 | 4,5,6,7 |
| Half Pixel Storage Device #2.5 | 2,3,4,5,6,7 |
| Integer Pixel Storage Device #3 | 5,6,7,8 |
| Half Pixel Storage Device #3.5 | 3,4,5,6,7,8 |
| Integer Pixel Storage Device #4 | 6,7,8,9 |
| Half Pixel Storage Device #4.5 | 4,5,6,7,8,9 |
| Integer Pixel Storage Device #5 | 7,8,9,10 |
| Half Pixel Storage Device #5.5 | 5,6,7,8,9,10 |
| Integer Pixel Storage Device #6 | 8,9,10,11 |
| Half Pixel Storage Device #6.5 | 6,7,8,9,10,11 |
| Integer Pixel Storage Device #7 | 9,10,11,12 |
| Half Pixel Storage Device #7.5 | 7,8,9,10,11,12 |
| Integer Pixel Storage Device #8 | 10,11,12,13 |
| Half Pixel Storage Device #8.5 | 8,9,10,11,12,13 |

… together with a pipeline method. Thus, timing delay is greatly reduced. However, this prior art has a big problem on signal-to-noise ratio (SNR) drop.

METHOD OF SCALABLE FRACTIONAL MOTION ESTIMATION FOR MULTIMEDIA CODING SYSTEM

FIELD OF THE INVENTION

The present invention relates to a fractional motion estimation (FME) more particularly, relates to adjusting calculation time and picture quality according to function requirements through a scalable FME and a block size trend prediction FME (BSTP-FME) for a real-time picture compression coding and a flexible hardware circuit device.

DESCRIPTION OF THE RELATED ARTS

Modern people usually use multimedia facilities for their leisure time, so better picture and voice qualities are highly expected. Since the Internet becomes a hit, data transference in a limited bandwidth arises needs for a low bit-rate and a high compression ratio. In the other hand, a real-time coding-decoding system is a basic need for watching or producing multimedia. And mobile communication is so popular now, hence the need for the real-time coding-decoding system for a multimedia mobile device appears. At the same time, a low power consumption becomes a standard design.

A fractional motion estimation (FME) is a key module in H 0.264, which achieves a real-time coding through hardware acceleration. Hence, an important study is on how to design an FME hardware module corresponding to various needs of picture compression quality scaleable through modifying parameters to obtain a best balance between calculation time and picture quality. Yet, only few FME hardware designs in the past consider needs on real-time coding and low power consumption, etc. at the same time, not to mention system integrity.

As shown in FIG. 23 and FIG. 24, a first prior art of FME is based on a 4×4 macroblock to interpolate data of a search range to the 4×4 macroblock. The interpolation starts from integer inputs to integer buffers. A row of macroblocks is processed through an interpolation having finite-duration impulse responses (FIR) [82]. The interpolation uses a horizontal interpolation buffer [813] and a vertical interpolation buffer [814]. An MV cost generator [83] figures out MV costs for corresponding fractional pixels; then the MV costs are transferred to a comparator [85] through a cost mode generator [84] for accumulating the costs and selecting to obtain a best combination for the macroblock.

This structure obtains a good FME module but four of the same design are required, which uses about 290 k logic gates, for reaching an operation standard of H. 264/AVC at 100 MHz. After a close examination, it is found that this structure is based on 4×4 macroblocks and so calculation speed is hard to improve. And so multiple sets of a design are required to increase a calculation parallelism.

As shown in FIG. 25 to FIG. 29, a second prior art FME refines the interpolation method. Original horizontal 6-tap FIR filters are changed into diagonal 6-tap FIR filters to overcome a bottleneck on a wide bandwidth, while vertical 6-tap FIR filters are changed into broadcasting 6-tap FIR filters as well (as shown in FIG. 28A to FIG. 29). Thus, originally, the horizontal 6-tap FIR filters requires 6 cycles (as shown in FIG. 27) with 6 pixels transferred in each cycle to figure out a half point with the 36 pixels in total. After using the diagonal 6-tap FIR filters instead of the horizontal 6-tap FIR filters, 6 cycles with 1 pixel transferred in each cycle only are required to figure out a half point with a saving of data Hence, the prior arts do not fulfill all users' requests on actual use.

SUMMARY OF THE INVENTION

The main purpose of the present invention is to change calculation time and picture quality according to function requirements through a scalable FME and a block size trend prediction FME (BSTP-FME) for a real-time picture compression coding and a flexible hardware circuit device.

To achieve the above purpose, the present invention is a method of a scalable FME for a multimedia coding system, where an H. 264 coding is processed and a result is thus obtained to be divided into three quality levels for a scalable FME; then a BSTP-FME is processed with an IMV as a center for full search having a search range of ±2 fractional pixel to process motion estimations to 25 fractional pixels for estimating a required area and a parallelism for a hardware design and processing a selection according to SNR drop. Accordingly, a novel method of a scalable FME for a multimedia coding system is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

FIG. 6 is the view showing the schedule of the candidate point generator;

FIG. 11 is the view showing the interpolation valid data filter;

FIG. 12 is the view showing the distribution of the pixel storage devices;

FIG. 16 is the flow view showing the interpolation control;

DESCRIPTION OF THE PREFERRED EMBODIMENT

Figure 1:
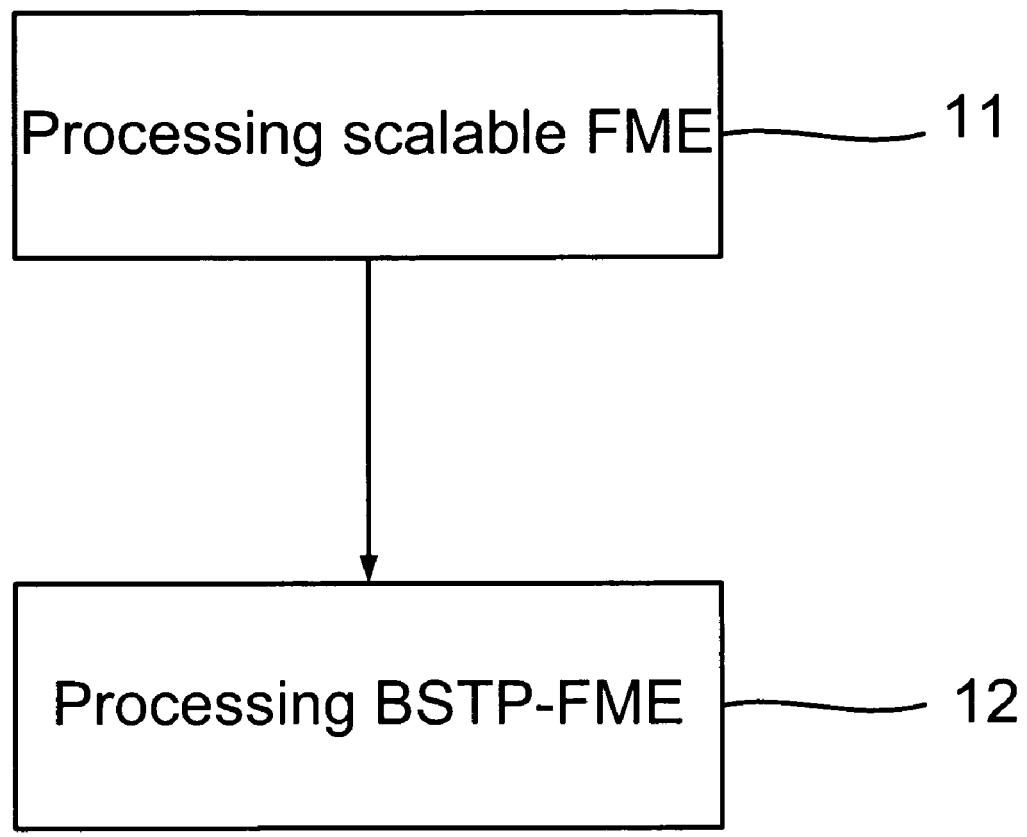
Figure 2:
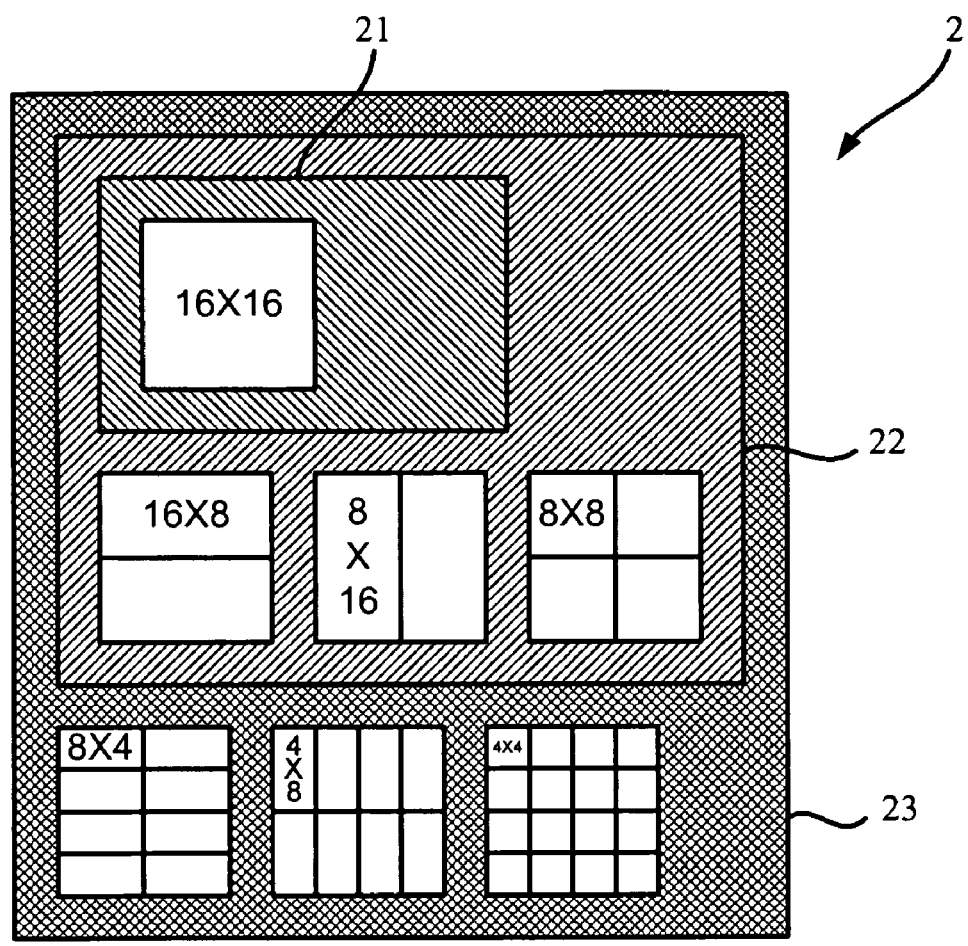
FIG. 2 is the view showing the quality
Figure 3:
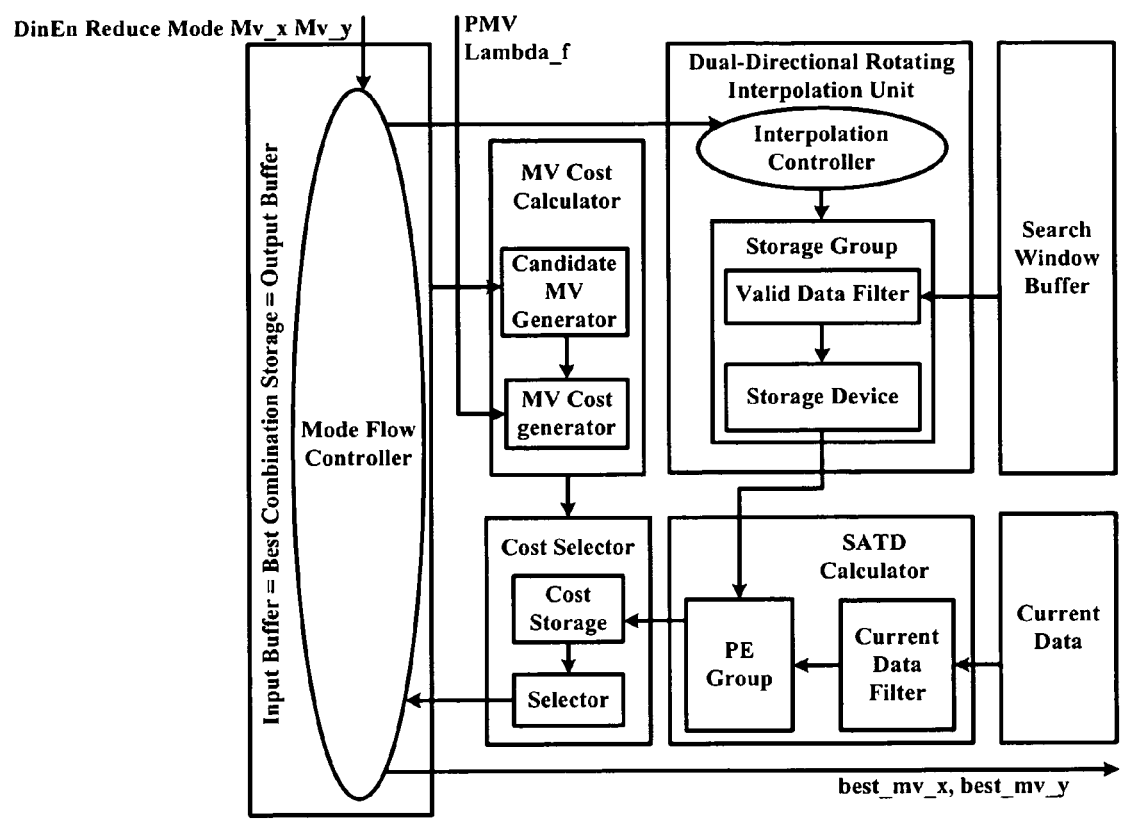
FIG. 3 is the structural view showing the BSTP-FME.
Figure 4:
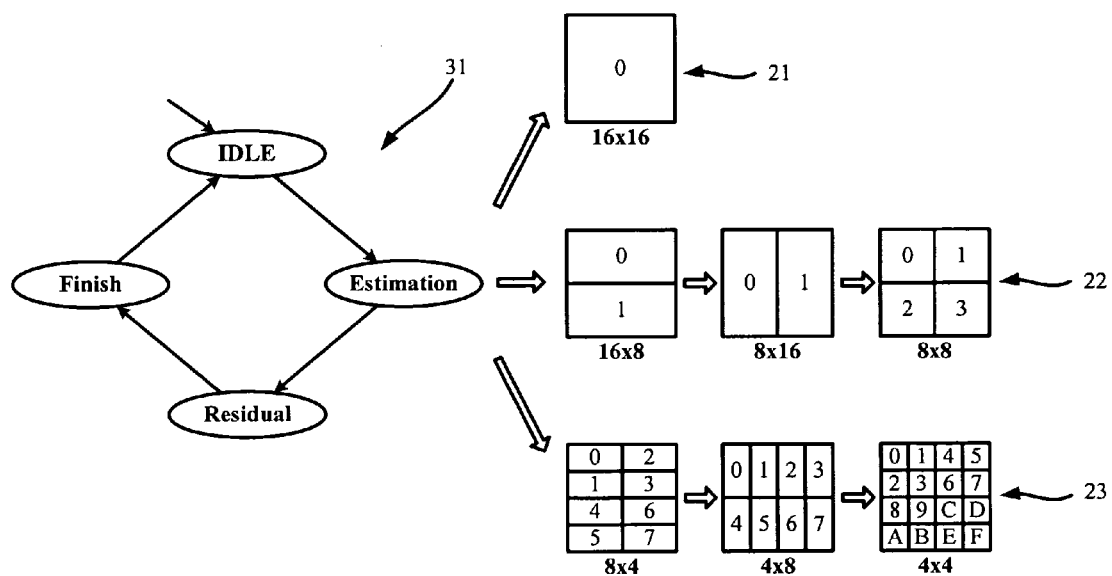
FIG. 4 is the structural view showing the mode flow controller.
Figure 5:
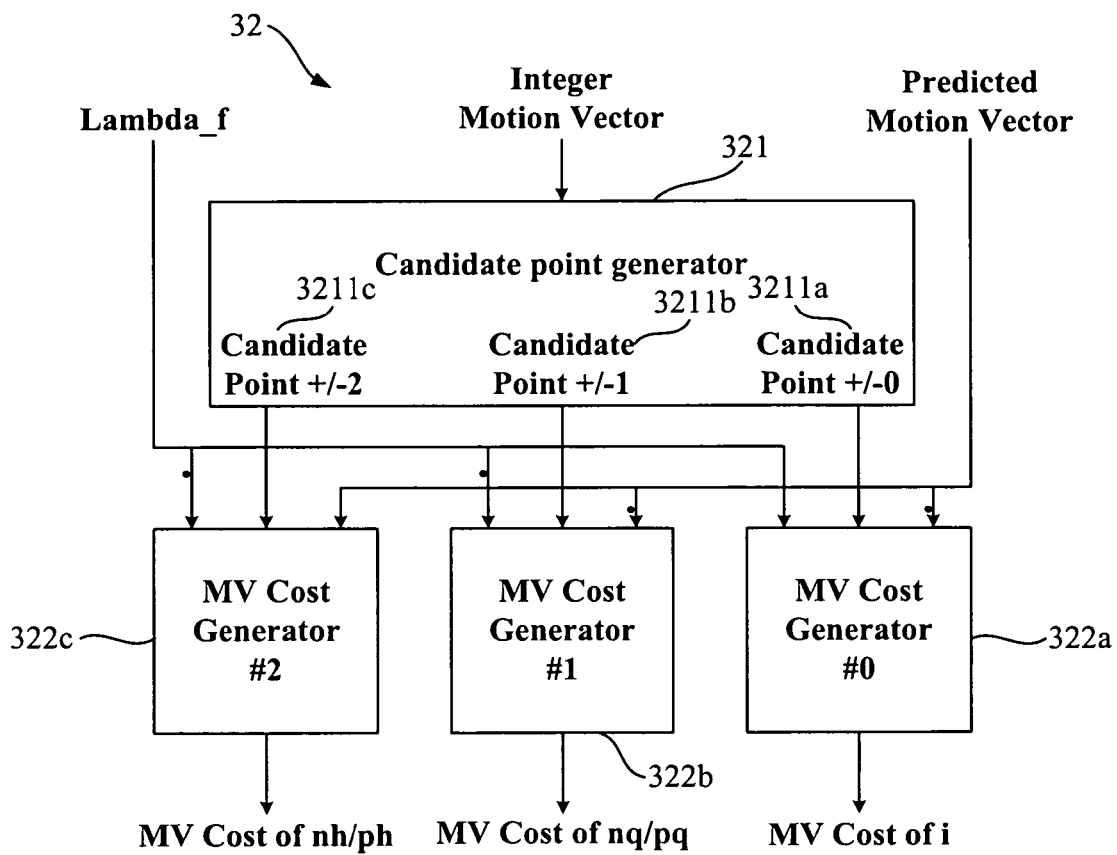
FIG. 5 is the structural view showing the MV cost calculator.

The following description of the preferred embodiment is provided to understand the features and the structures of the present invention.

Please refer to FIG. 1 to FIG. 4, which are a flow view showing a preferred embodiment according to the present invention; a view showing quality levels; and structural views showing a BSTP-FME and a mode flow controller. As shown in the figures, the present invention is a method of a scalable FME for a multimedia coding system, comprising the following steps:

(a) Processing a scalable FME [11]: At first, an H 0.264 coding is processed. As a result, after processing a fractional motion estimation (FME), there are 80% in the best combinations for a macroblock consisting of 16×16, 16×8, 8×16 and 8×8 modes, and 20% consisting of 8×4, 4×8 and 4×4 modes. In the 16×16, 16×8, 8×16 and 8×8 modes, the 16×16 mode has the highest ratio. Accordingly, the seven modes of 16×16, 16×8, 8×16, 8×8, 8×4, 4×8 and 4×4 are then divided into three quality levels [2] to obtain a quality scalability for a scalable FME for estimation and calculation to meet various needs in various usage levels. The quality levels comprise the following three levels:

(a) Single mode [21]: In the single mode [21], only a set of integer motion vectors (IMV) for the 16×16 mode is processed. Hence, time required is short and picture quality obtained is not so good.

(b) Concise mode [22]: In the concise mode [22], 9 sets of IMVs for the 16×16, 16×8, 8×16 and 8×8 modes are processed. Hence, time required and picture quality obtained are longer and better than those for the single mode.

(c) Complete mode [23]: In the complete mode [23], 41 sets of IMVs for the 16×16, 16×8, 8×16, 8×8, 8×4, 4×8 and 4×4 modes are all processed. Hence, time required is the longest and picture quality obtained is the best.

After the three levels are obtained, scalable FMEs are processed to the 16×16, 16×8, 8×16, 8×8, 8×4, 4×8 and 4×4 modes sequentially. From the data obtained after the scalable FME, signal-to-Noise ratio (SNR) drops for the complete mode [23] and the concise mode [22] are both smaller than 0.1 dB. Hence, when a high quality picture is required and a real-time processing is available, the complete mode [23] is selected for a higher operation frequency. Or, when the picture is small and the SNR drop is not noticeable, the single mode [21] or the concise mode [22] is selected to shorten the processing time with fewer calculations; and working frequency and power voltage used are low so that a power consumption is reduced for a real-time processing (b) Processing a BSTP-FME [12]: Then, a block size trend prediction FME (BSTP-FME) [12], which is fit for a hardware design, is processed. In the BSTP-FME [12], an IMV is taken as a center for a search range having a various size and shape to estimate a required area and parallelism for the hardware design and are selected according to its SNR drop. Therein, the search range is a full search to ±2 fractional pixels. Thus, 25 fractional pixels are processed with motion estimations.

On processing the BSTP-FME, a mode flow controller [31] receives the IMVs and a schedule for processing the IMVs is decided. Then the scheduled IMVs are transferred to an MV cost calculator [32] and a dual-directional rotation interpolation unit [33], where MV costs for the 25 fractional pixels are calculated through the MV cost calculator [32] and data are interpolated through the dual-directional rotation interpolation unit [33]. Then the interpolated data are transferred to a sum-of-absolute-transformed-differences (SATD) calculator [34] to obtain SATDs of the 25 fractional pixels. At last, MV cost corresponding to the 25 fractional pixels and the SATDs are transferred to a cost selector [35] for accumulating the costs and selecting to obtain a best combination for the macroblock. Thus, on designing a hardware with the present invention, a best balance is obtained between the area and the calculation speed and a quality scalability is obtained for wide applications.

The present invention uses a scalable FME to obtain a scalability with a BSTP-FME, where an amount of data modes processed in a hardware is adjusted according to a facility requirement. A level selection is all that is required without any complex setups of an additional bandwidth for communicating data and instruction with the system. Hence, the present invention has a simple structure and an easy practice for obtaining a high-quality picture. Besides, almost 100% hardware usage is obtained because the BSTP-FME is so suitable for hardware design. Consequently, the present invention has a high flexibility, a low cost and a high efficiency.

Figure 7:
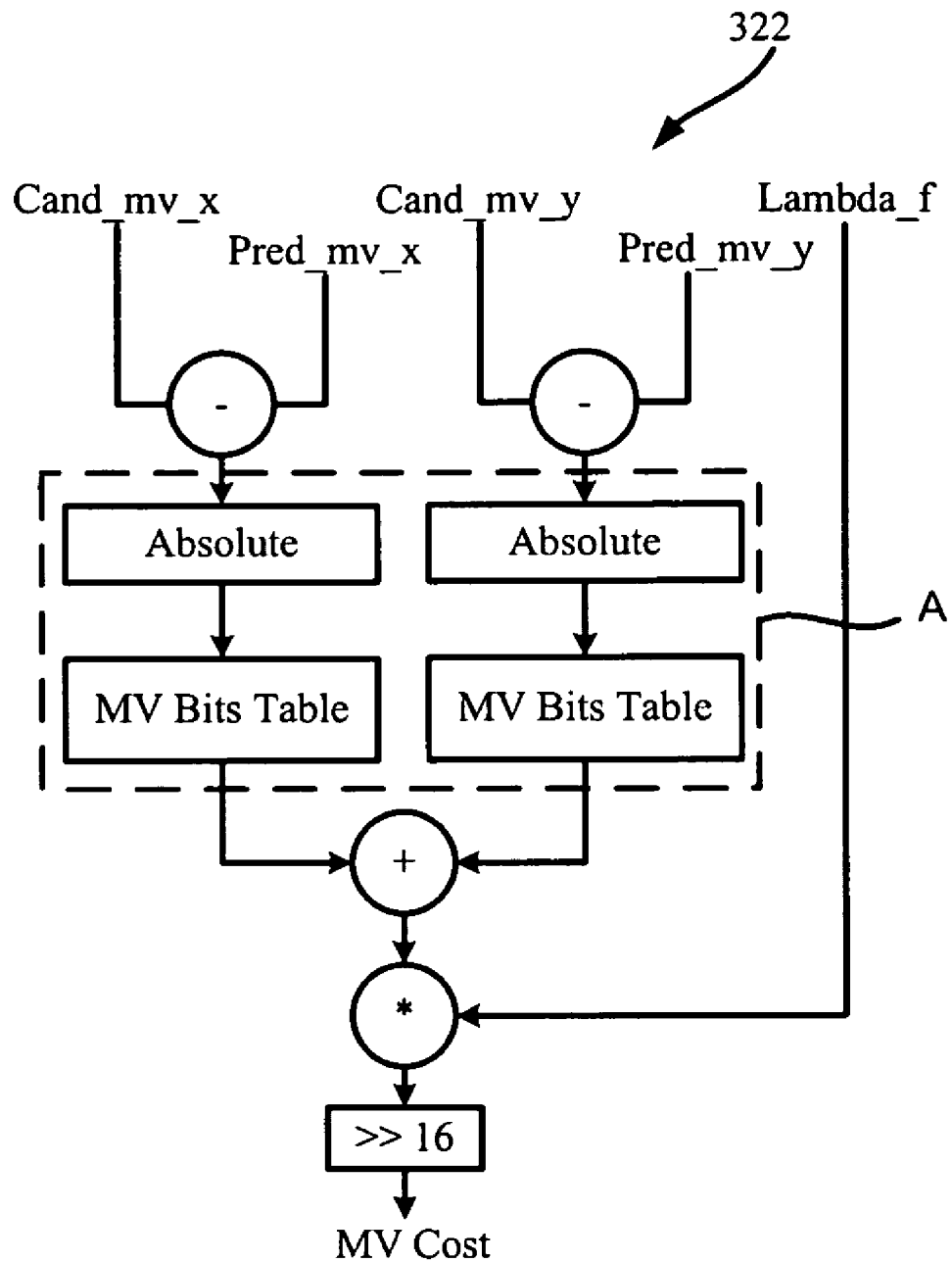
FIG. 7 is the structural view showing the MV cost generator.
Figure 8:
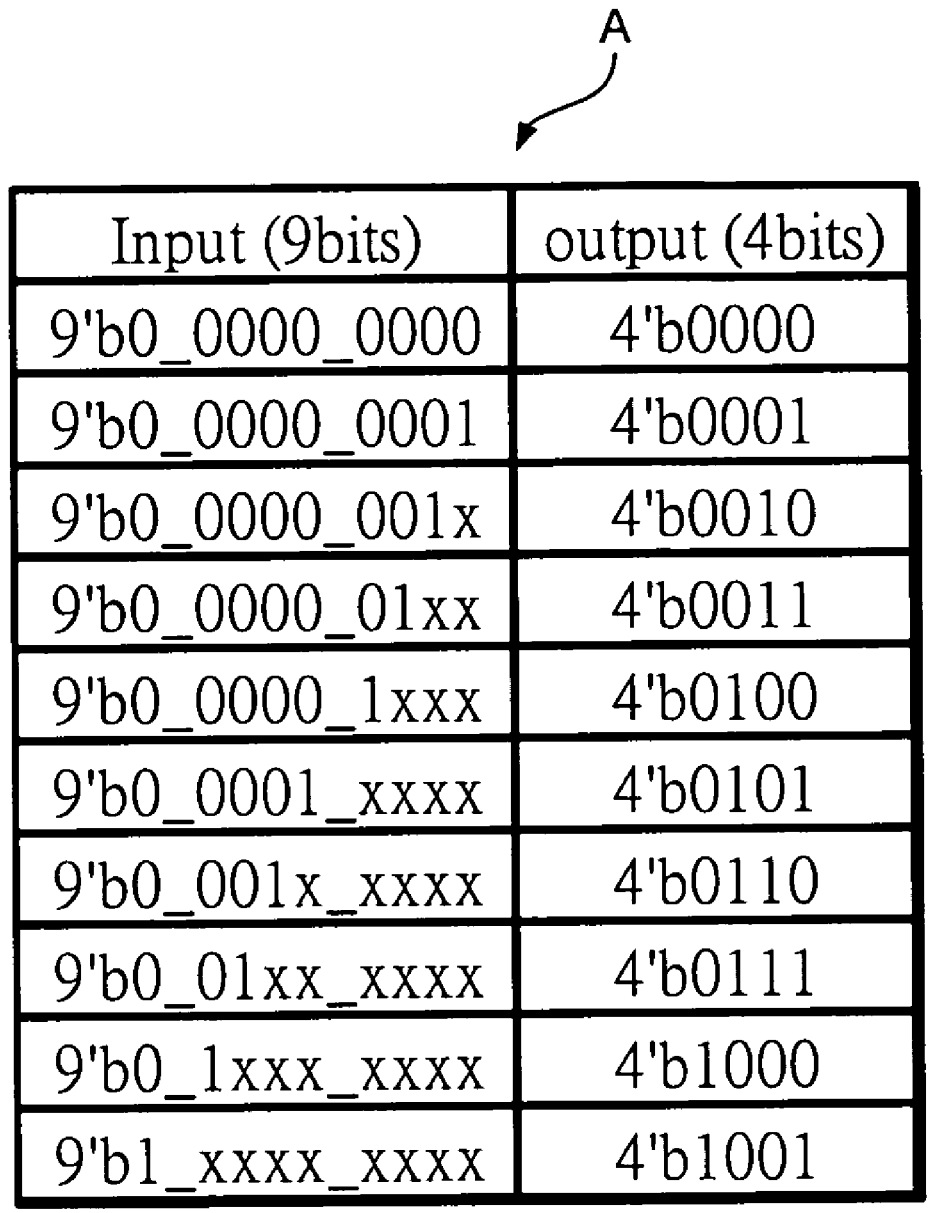
FIG. 8 is the view showing A in FIG. 7.
Figure 9:
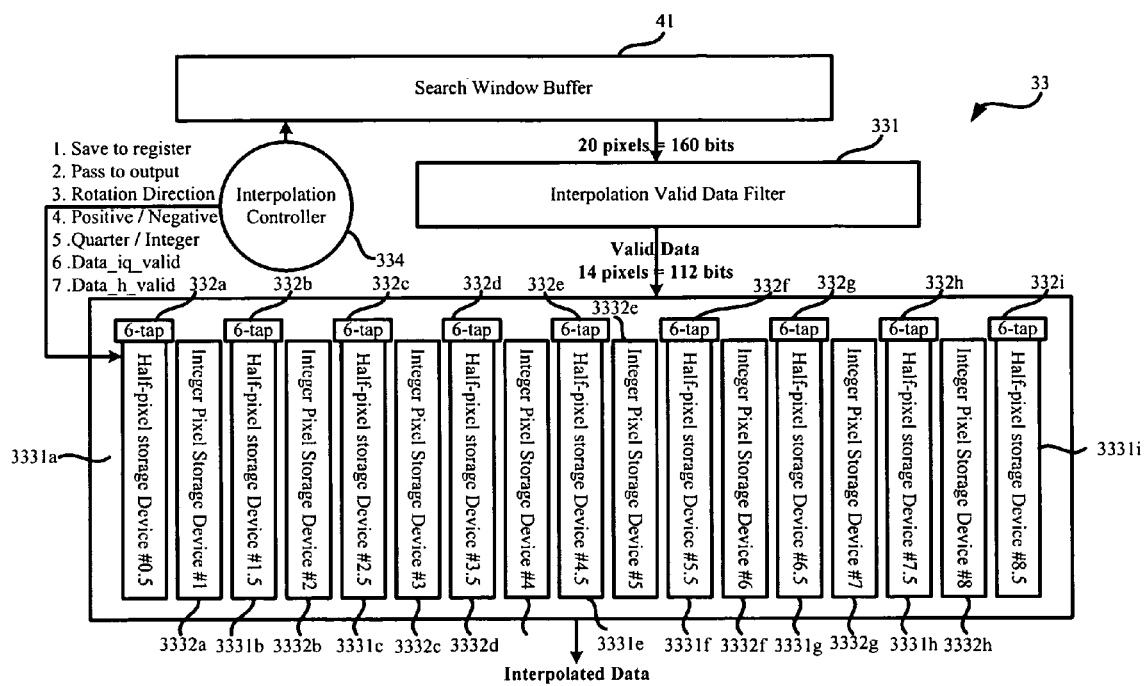
FIG. 9 is the structural view showing the dual-directional rotation interpolation unit
Figure 10:
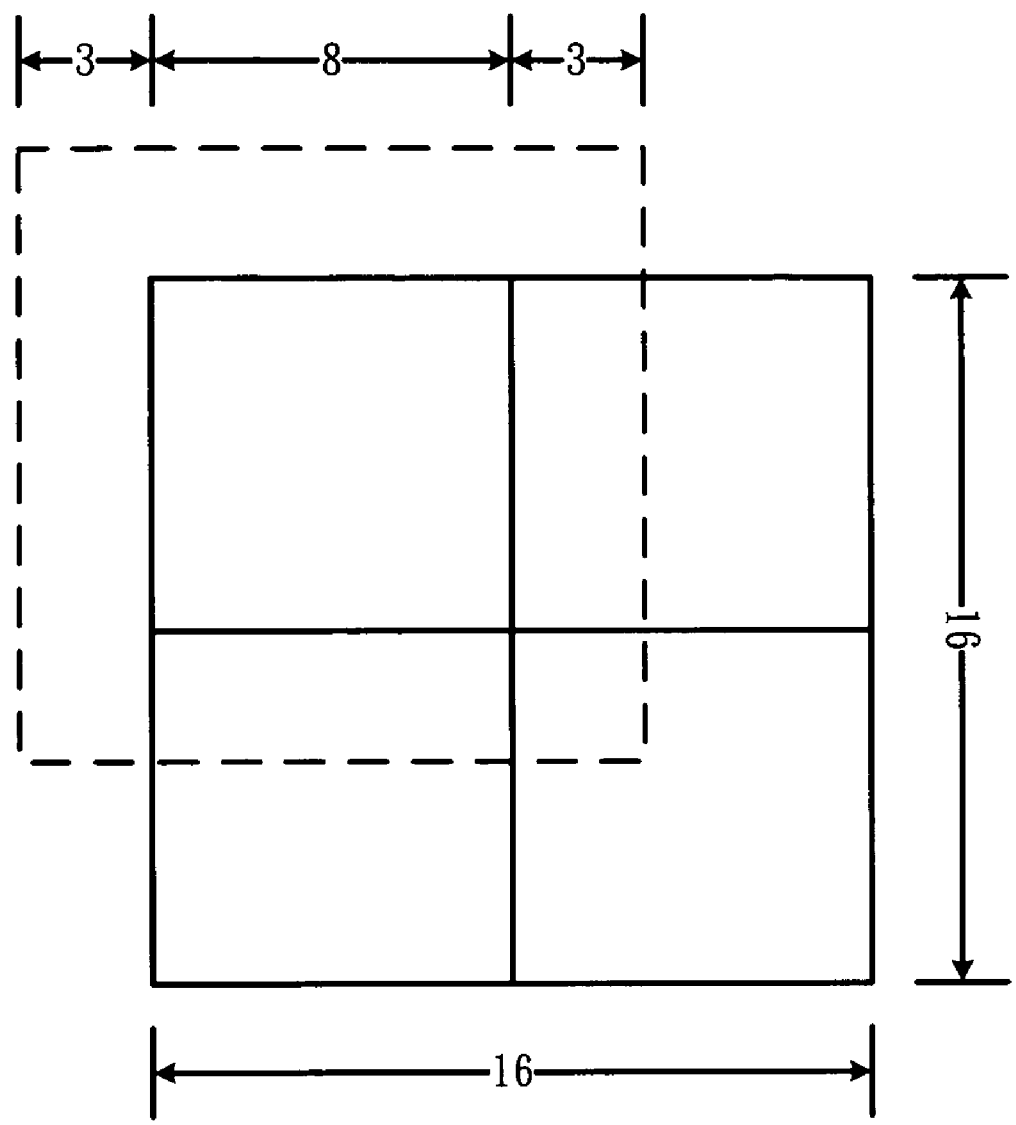
FIG. 10 is the view showing the calculation based on 8×4 macroblocks.

Please refer to FIG. 5 to FIG. 8, which are a structural view showing an MV cost calculator; a view showing a schedule of a candidate point generator; a structural view showing an MV cost generator; and a view showing A in FIG. 7. As shown in the figures, an MV cost calculator [32] comprises a candidate point generator [321] as a finite state machine; and the first, the second and the third MV cost generators [322a, 322b, 322c]. The candidate point generator [321] generates 25 candidate points around an IMV at center to meet a search range requirement of ±2. To further avoid collisions on writing data into a cost selector [35], a time for generating MV costs has to be earlier than that for generating SATDs. Hence, a first candidate point [3211a], a first candidate point [3211b] and a first candidate point [3211c] are generated a tone time; and a first MV cost generator [322a], a second MV cost generator [322b] and a third MV cost generator [322a] parallelly generate corresponding MV costs. In the other hand, the sequence for generating the MV costs has to be the same as that for generating the SATDs. Hence, in a schedule for the candidate point generator [321], candidate points with an Y coordinate of 0 are generated at first in mode 1 and 2, which are (−2, 0), (−1, 0), (0, 0), (1, 0) and (2, 0). Then candidate points with the Y coordinate of −2 are generated in mode 3 and 4; then with the Y coordinate of −1, in mode 5 and 6; then with the Y coordinate of 2, in mode 7 and 8; then with the Y coordinate of 1, in mode 9 and 10; and then it is returned back to an idle mode for a next level. Therein, the MV cost generators obtain MV bits from an MV bits table, noted as A in FIG. 7.

Please refer to FIG. 9 to FIG. 12 which are a structural view showing a dual-directional rotation interpolation unit; views showing a calculation based on 8×4 macroblocks, an interpolation valid data filter, a distribution of pixel storage devices, and a 6-tap FIR filter; structural views showing a half pixel storage device and an integer pixel storage device; and a flow view showing the interpolation control. As shown in the figures, a dual-directional rotation interpolation unit [33] uses an interpolation controller [334] to figure out address data in a super wide band (SWB) [41] and a signal is sent to the SWB [41] to request pixel data, where data received from the SWB are also processed.

Figure 13:
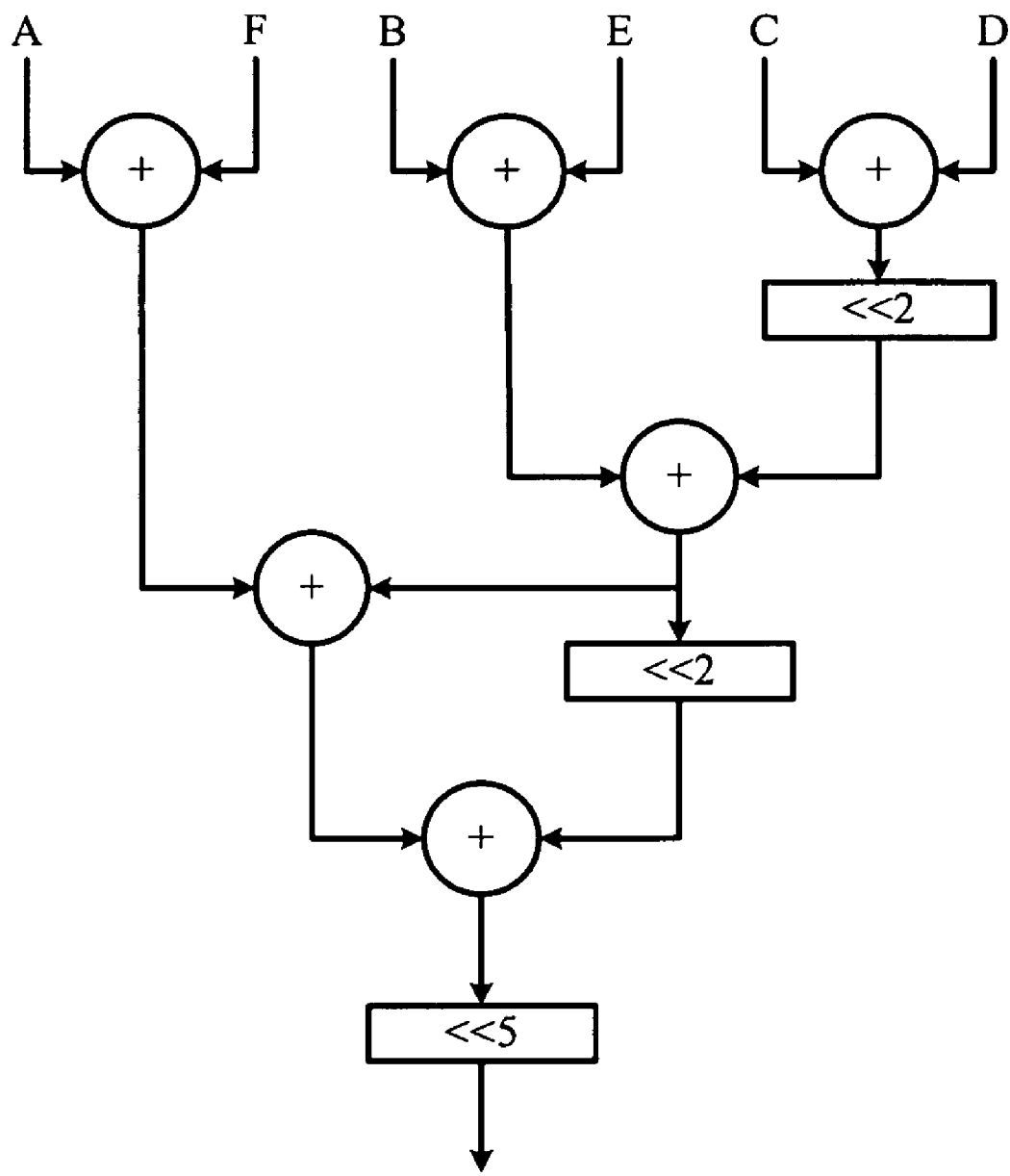
FIG. 13 is the view showing the 6-tap FIR filter.

Collisions may be happened on accessing data in various addresses in the same memory of the SWB [41], which may further reduce an accessing speed; and, furthermore, the algorithm for the present invention is base on 8×4 macroblocks. To avoid the collisions and fit the algorithm, on processing interpolations to each row having 6-tap FIR filters [332a~332i] (as shown in FIG. 13), three more pixels are acquired at both the leftest and the most right to obtain total data of 14 pixels as reference data required for mode 8×8. And when a picture edge is met, replacements are processed through padding.

Figure 14:
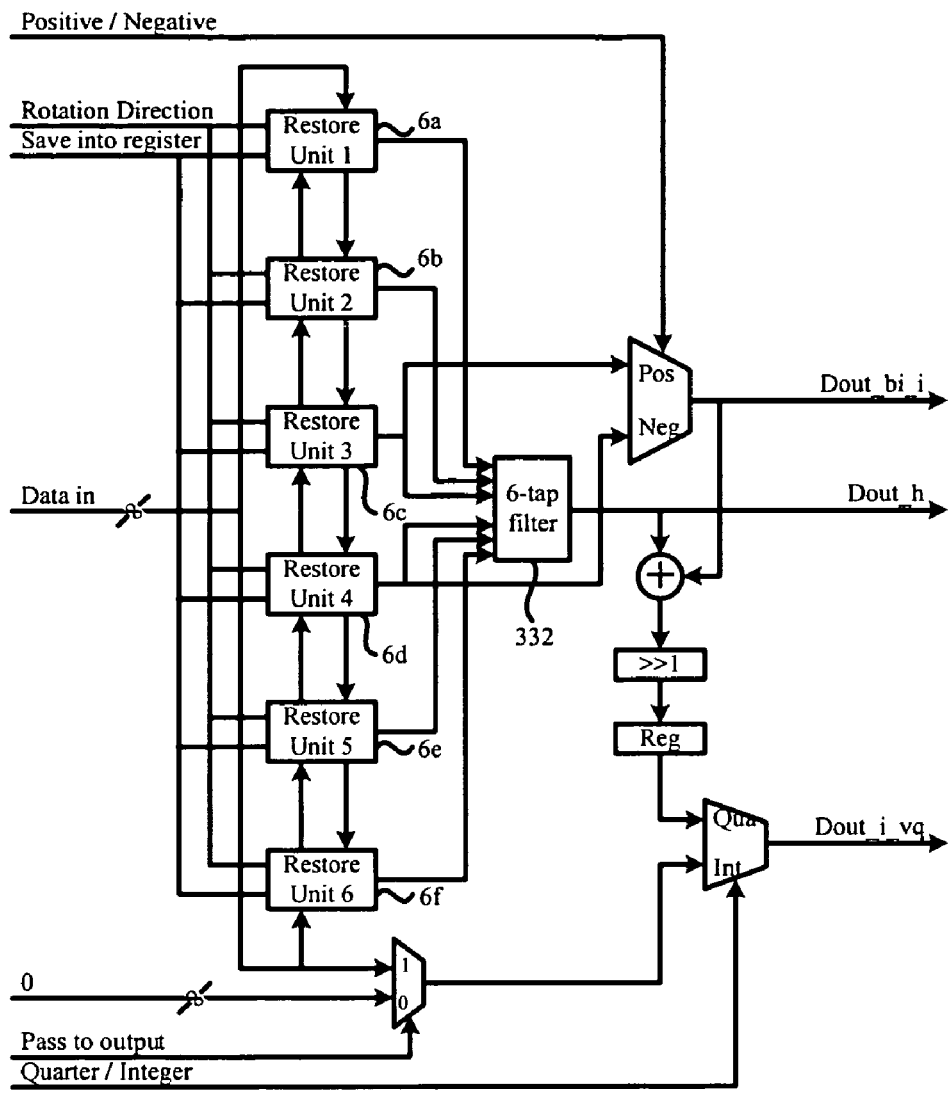
FIG. 14 is the structural view showing the half pixel storage device.
Figure 15:
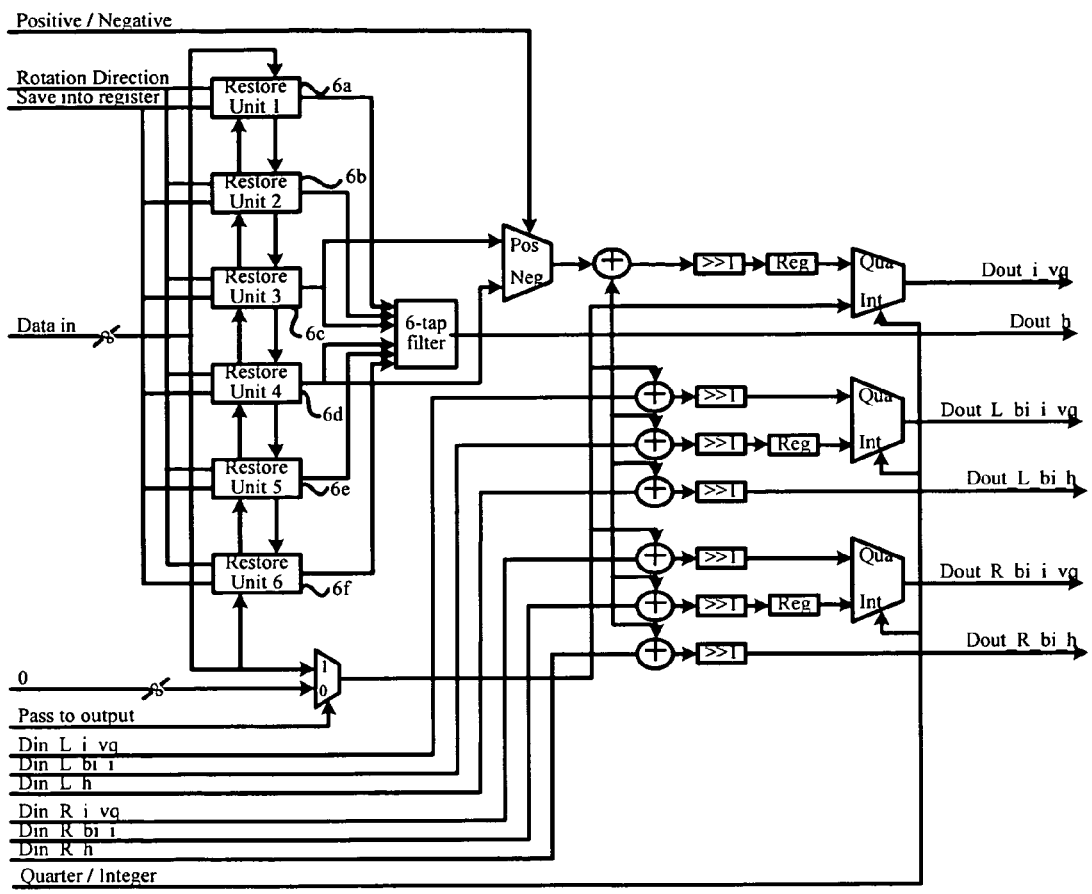
FIG. 15 is the structural view showing the integer pixel storage device.

Under the above considerations for accessing the SWB [41], the SWB [41] comprises 7 banks, each bank having a width of 4 pixels. 5 banks, a total of 20 pixels, are accessed each time to solve the problem of collisions, where the 20 pixels definitely contains the required 14 pixels and so the problem for the SWB [41] is solved. After the interpolation valid data filter [331] obtains the 20 pixels from the SWB [41], 14 valid pixels are filtered out (as shown in FIG. 11) since both the beginnings and the endings are not at the edges of the SWB [41]. Then the valid data are transferred to 9 half pixel storage devices [3331a~3331i] and 8 integer pixel storage devices [3332a~3332h] (as shown in FIG. 12). Then, the interpolations processed to the 17 storage devices [333] are controlled through a coordination with interpolation control signals from the interpolation controller [334] (as shown in FIG. 14 to FIG. 16.)

Figure 16:
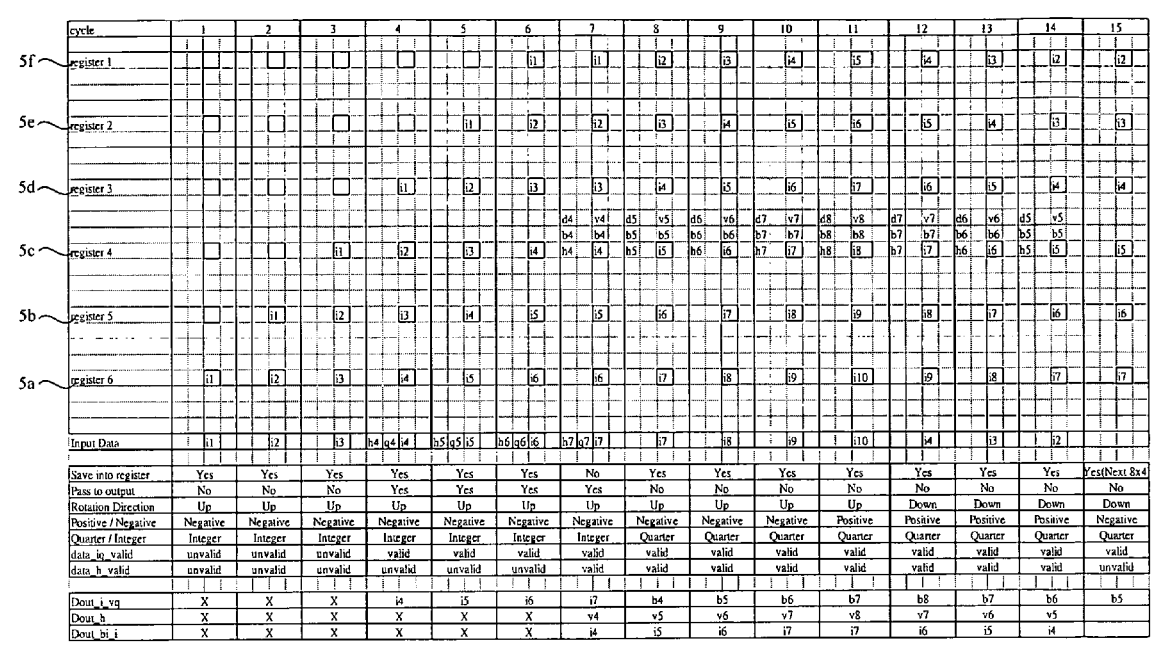

As shown in FIG. 16, the interpolation schedule for 8×4 macroblocks is processed by the interpolation controller [334] from top to bottom. Each row is a cycle, where a first register to a sixth register [5a-5f] are corresponding to a first restore unit to a sixth restore unit [6a-6f]. 'Input Data' means pixels inputted in the cycle; 'Save into register' decides whether the inputted data are stored to the registers in the cycle; 'Pass to output' decides whether the inputted data are transferred to dout_i_vq directly; 'Rotation Direction' decides whether the data from the first register [5a] are transferred to the second register [5b] or the sixth register [5f]; 'Positive/Negative' shows the character of Y coordinate of the data, where it is Positive to show Y as 1 or 2 and it is Negative to show Y as 0, −1 or −2; 'Quarter/Integer' shows the character of Y coordinate of outputted data, where it is Integer to show Y as 0 and it is Quarter to show Y as +1 or '−1; data_iq_valid' shows that outputted data from 'dout_i_vq' is valid; 'data_h_valid' shows that outputted data from 'dout_h' is valid; 'dout_i_vq' outputs data when integer/fractional pixel storage device has a coordinate of 0, −1 or +1; 'dout_h' outputs data when integer/fractional pixel storage device has a coordinate of −2 or +2; and 'dout_bi_i' outputs data for processing a bilinear filter in the integer pixel storage devices. Therein, cycle 1 to cycle 3 store data to registers only; cycle 4 to cycle 7 directly output data in units of 8×4 macroblocks after finishing interpolations with a search range for Y coordinate as 0; cycle 8 to cycle 11 finish interpolations with a search range for Y coordinate as −1; cycle 12 to cycle 15 finish interpolations with a search range for Y coordinate as +1; and, parallel interpolations are calculated, including that with a search range for Y coordinate as −2 in cycle 5 to cycle 8 and that with a search range for Y coordinate as +2 in cycle 9 to cycle 12.

Figure 17:
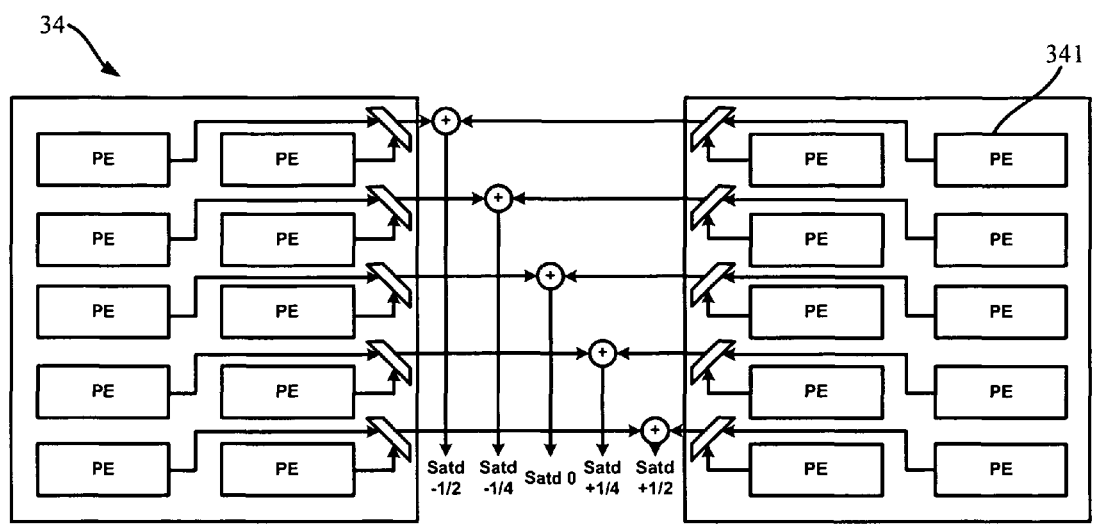
FIG. 17 is the structural view showing the SATD calculator.
Figure 18:
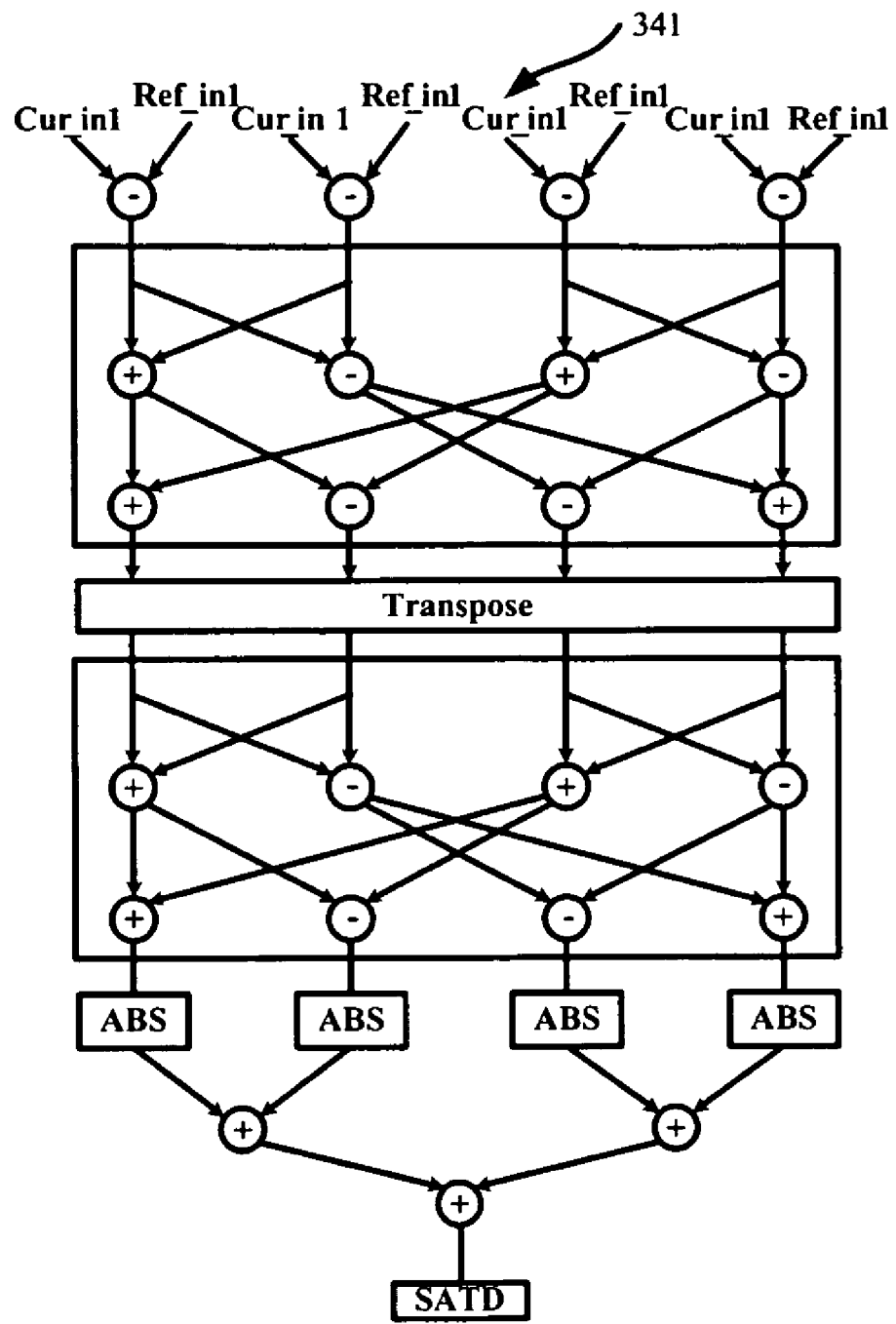
FIG. 18 is the structural view showing the PE.
Figure 19:
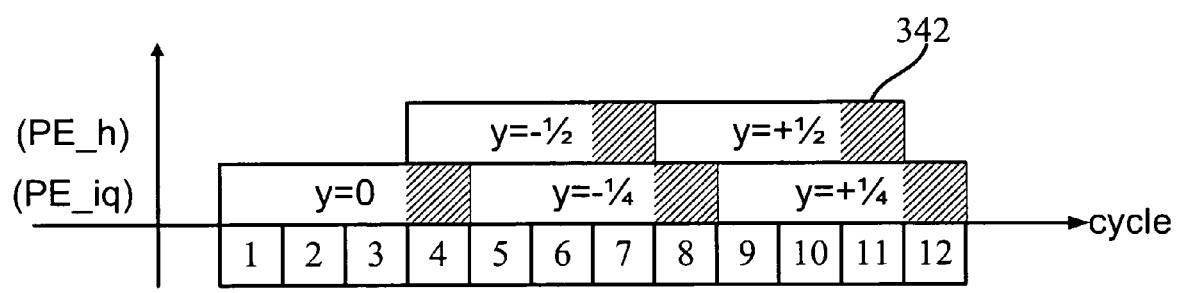
FIG. 19 is the view showing the generation sequence of SATDs.

Please refer to FIG. 17 to FIG. 19, which are structural views showing a SATD calculator and a PE; and a view showing a generation sequence of SATDs. As shown in the figures, an SATD calculator [34] comprises 20 processing elements (PE) [341], where every 10 PEs are correspondent for calculating an SATD of a 4×4 macroblock to be fit for a calculation based on 8×4 macroblocks. The PEs with 'pe_0' initials calculate an SATD of a left-half 4×4 macroblock of the 8×4 macroblock and the PEs with 'pe_1' initials calculate an SATD of a right-half 4×4 macroblock of the 8×4 macroblock, where the PEs with 'pe_0_iq' or 'pe_1_iq' initials deal with 'dout_i_vq' data from the dual-directional rotation interpolation unit [33], which are pixels at positions of integer and ±¼; the PEs with 'pe_0_h' or 'pe_1_h' initials deal with 'dout_i_h' data from the dual-directional rotation interpolation unit [33], which are pixels at positions of ±½; and notations of nh, nq, i, pq and ph to PEs [341] indicate candidate points having X coordinates of −2, −1, 0, 1 or 2 in a search range, respectively. Because each PE obtains a valid SATD very 4 cycles, an SATD of 25 candidate points in the 8×4 macroblock is obtained in a Y-coordinate sequence of 0, −2, −1, +2 and +1 to be transferred to the cost selector [35].

Figure 20:
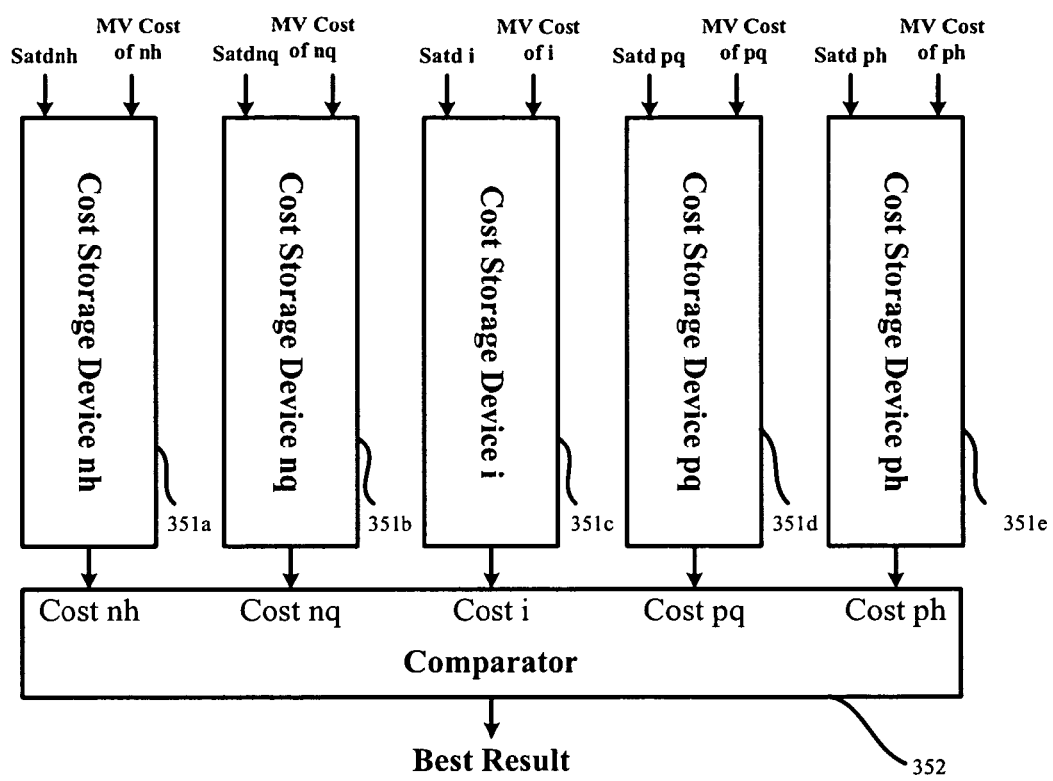
FIG. 20 is the structural view showing the cost selector.
Figure 21:
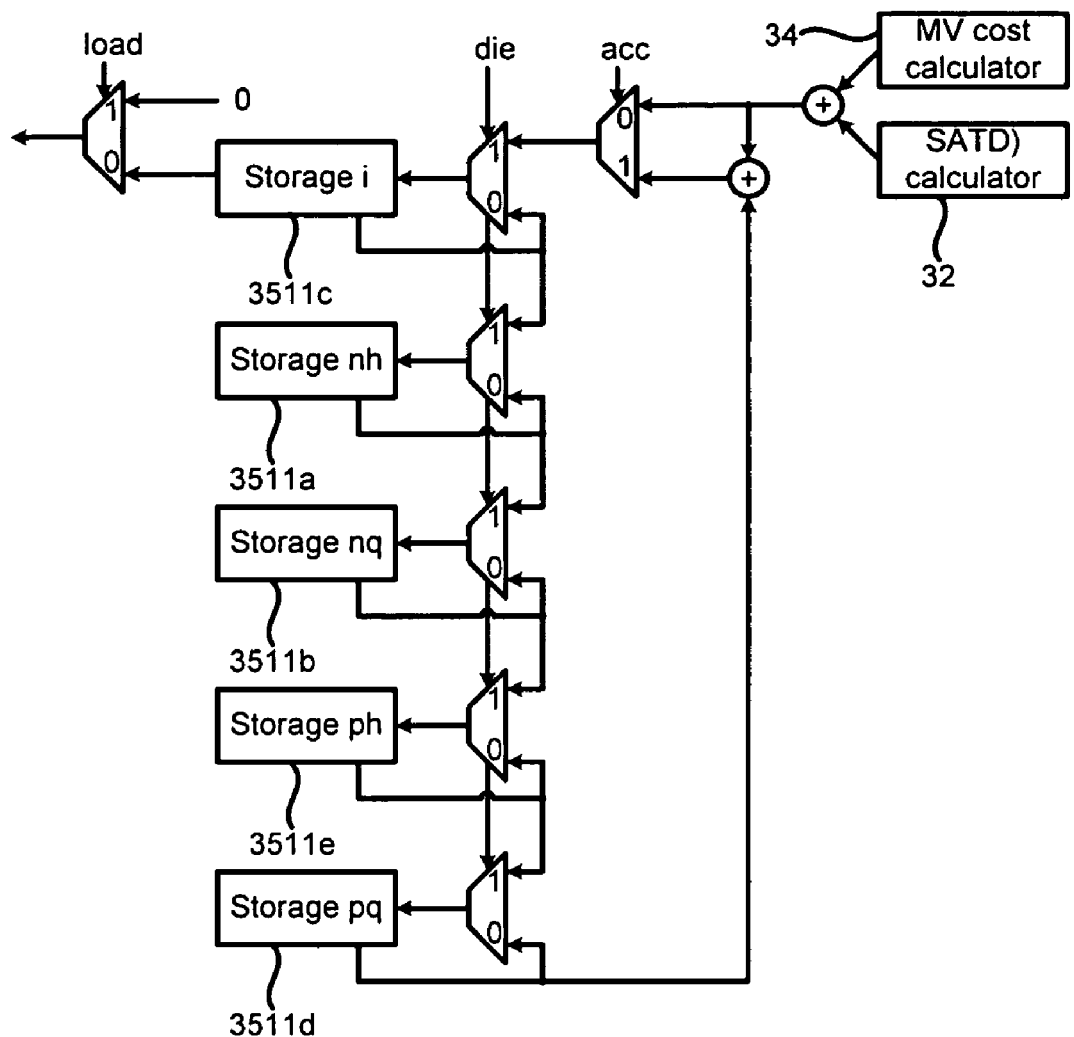
FIG. 21 is the structural view showing the cost storage device.
Figure 22:
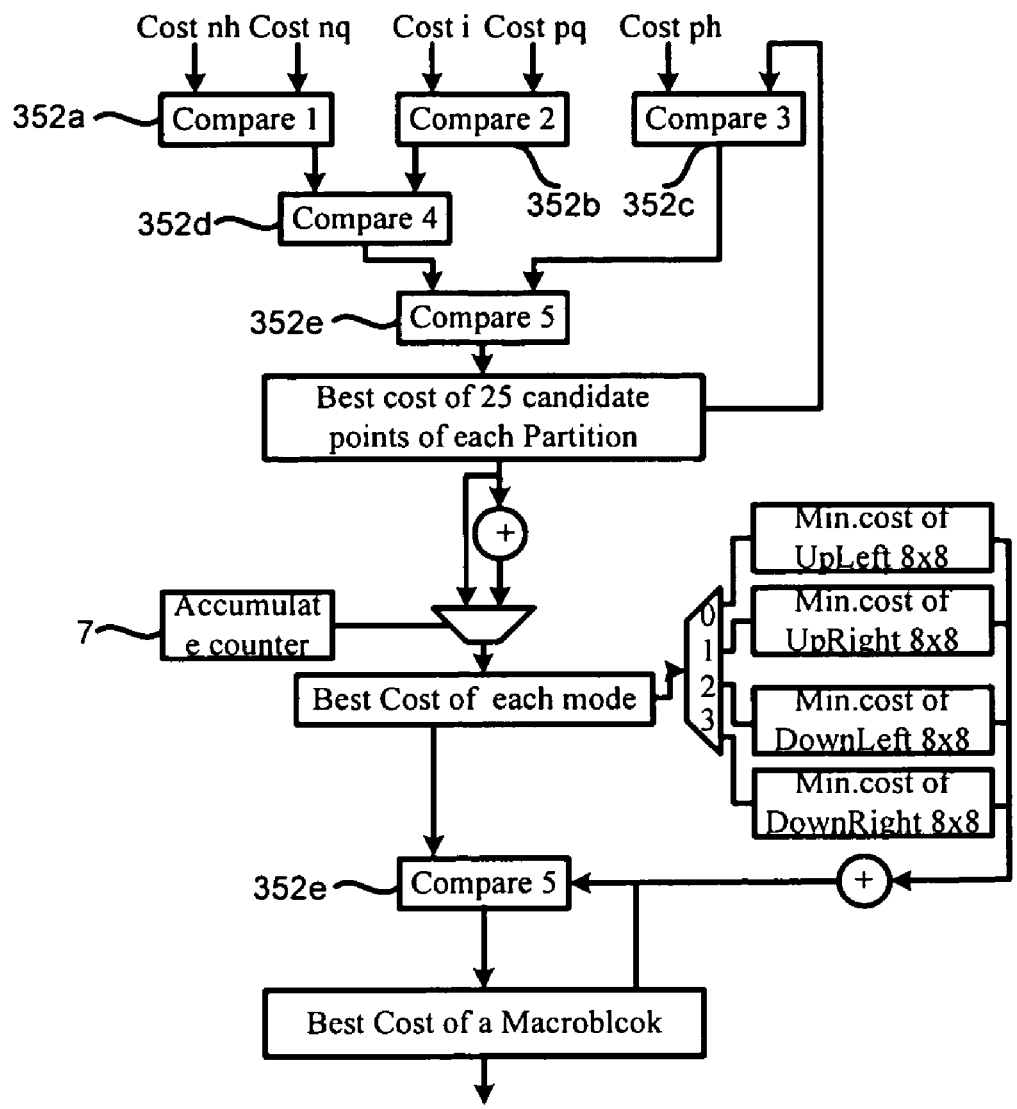
FIG. 22 is the structural view showing the comparator.
Figure 23:
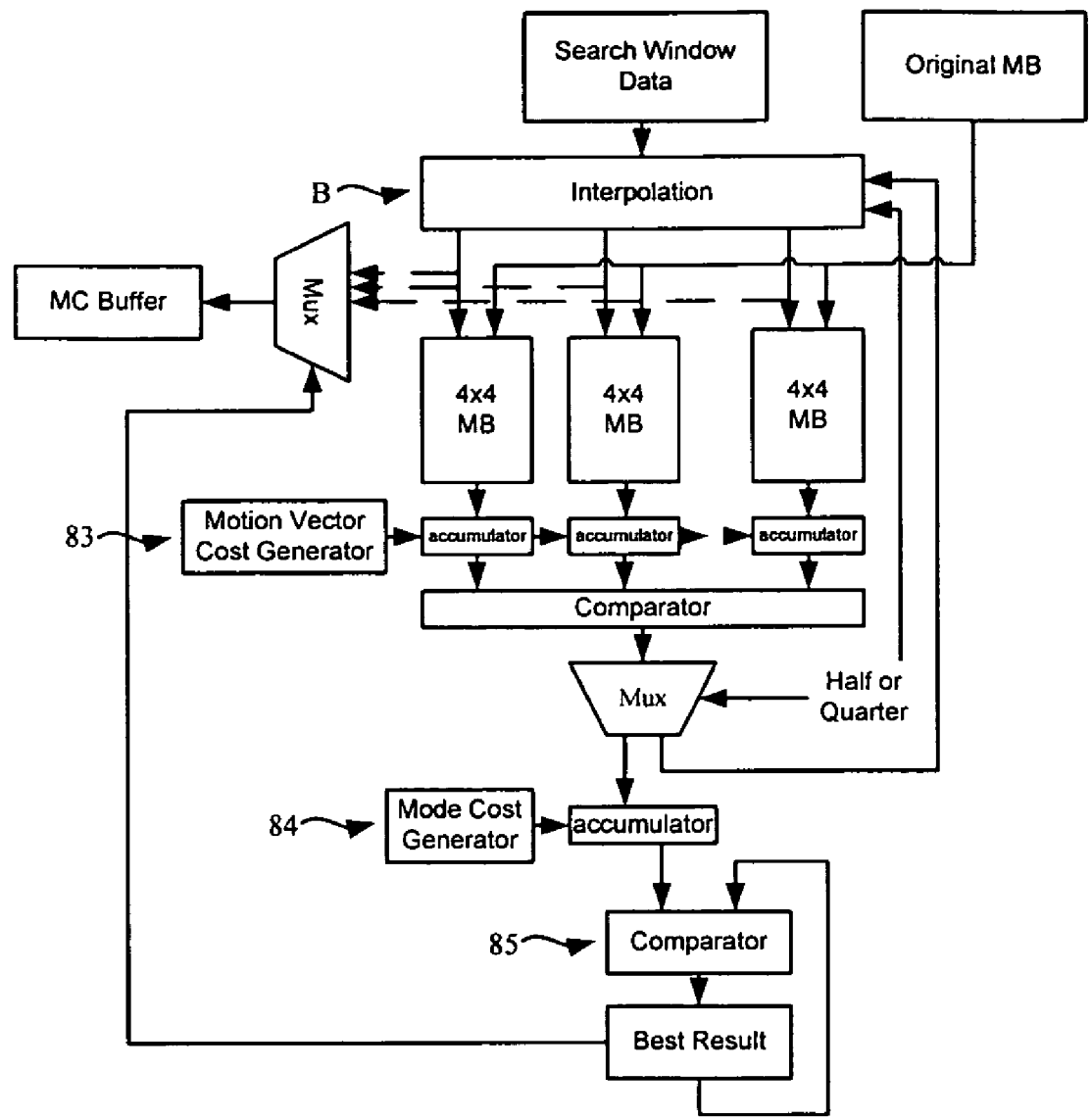
FIG. 23 is the FME structural view of the first prior art.
Figure 24:
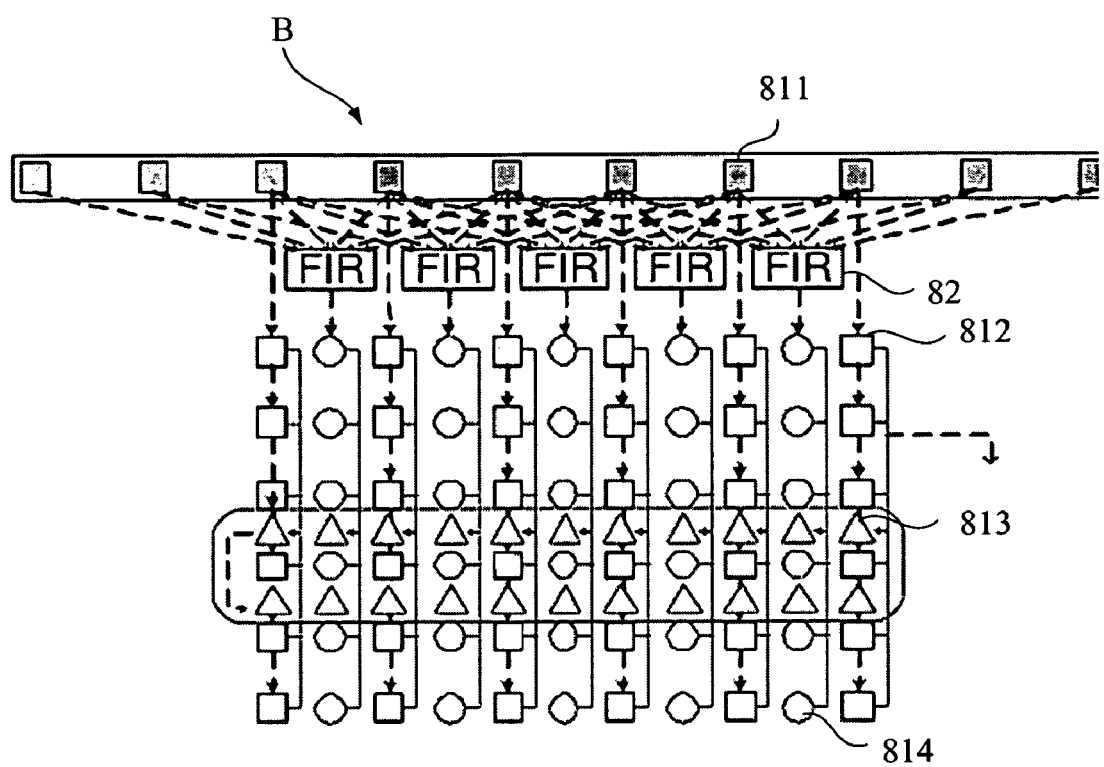
FIG. 24 is the interpolation structural view of the FME of the first prior art.
Figure 25:
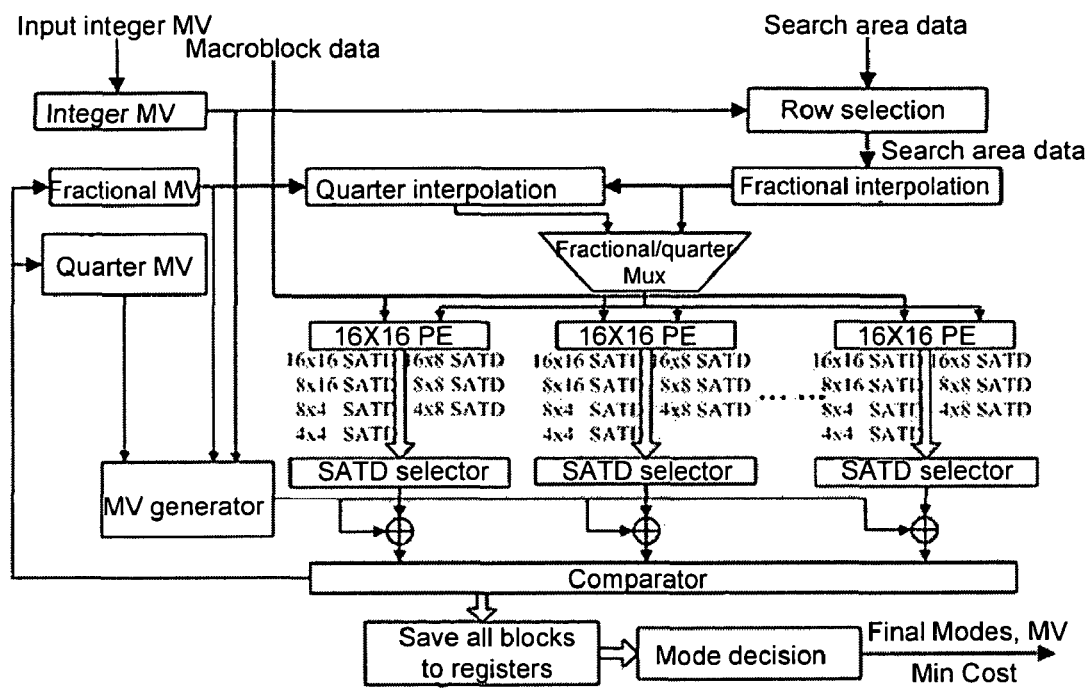
FIG. 25 is the FME structural view of the second prior art.
Figure 26:
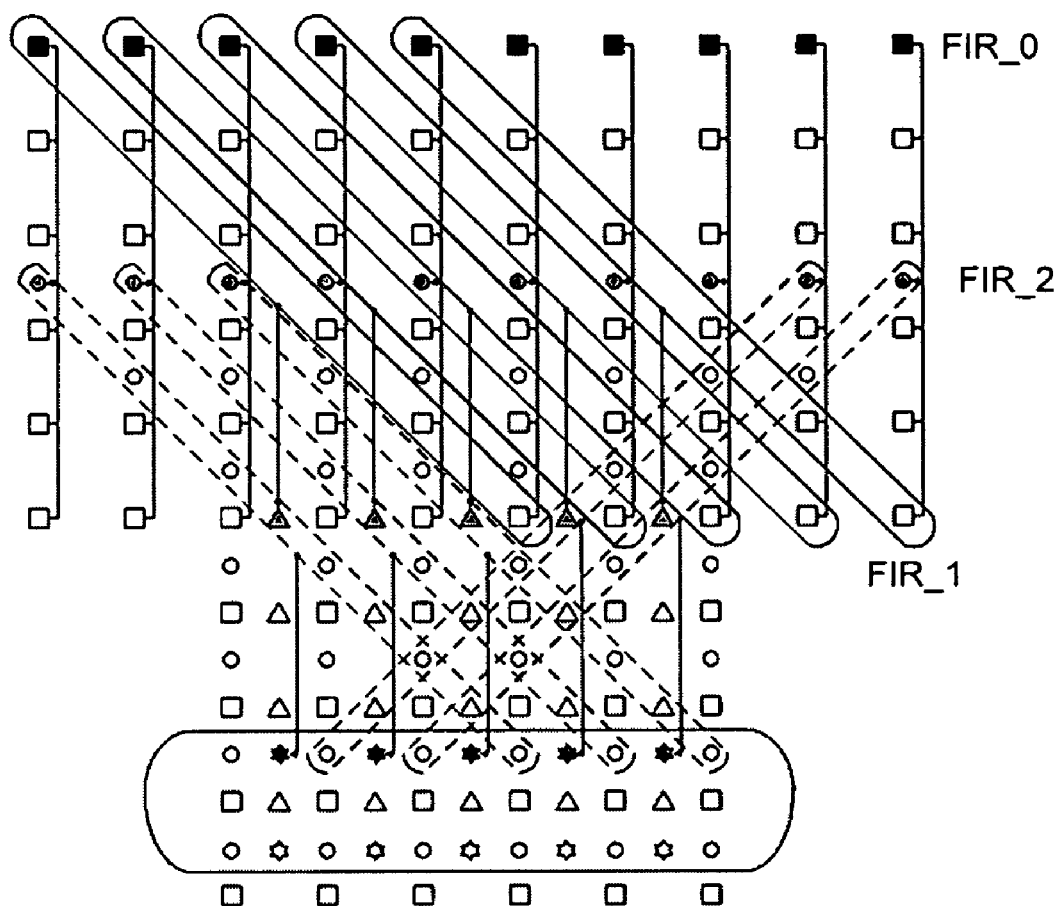
FIG. 26 is the interpolation structural view of the FME of the second prior art.
Figure 27:
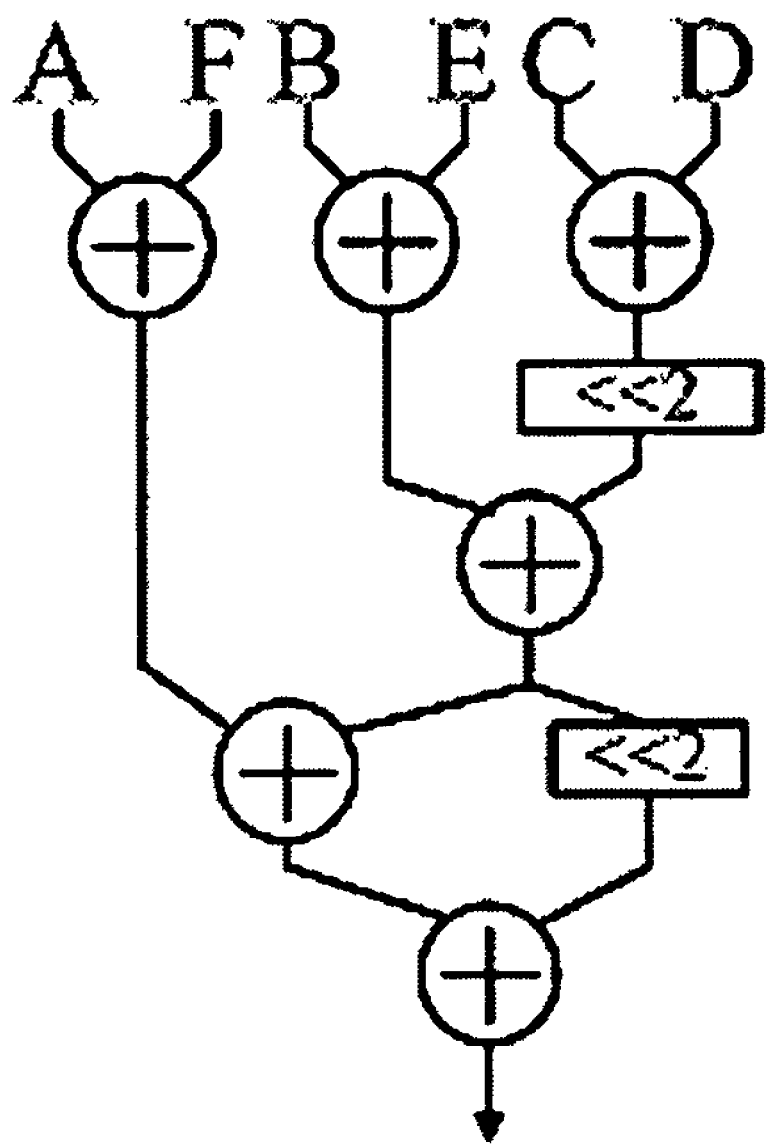
FIG. 27 is the structural view of the general horizontal 6-tap FIR filter.
Figure 28A:
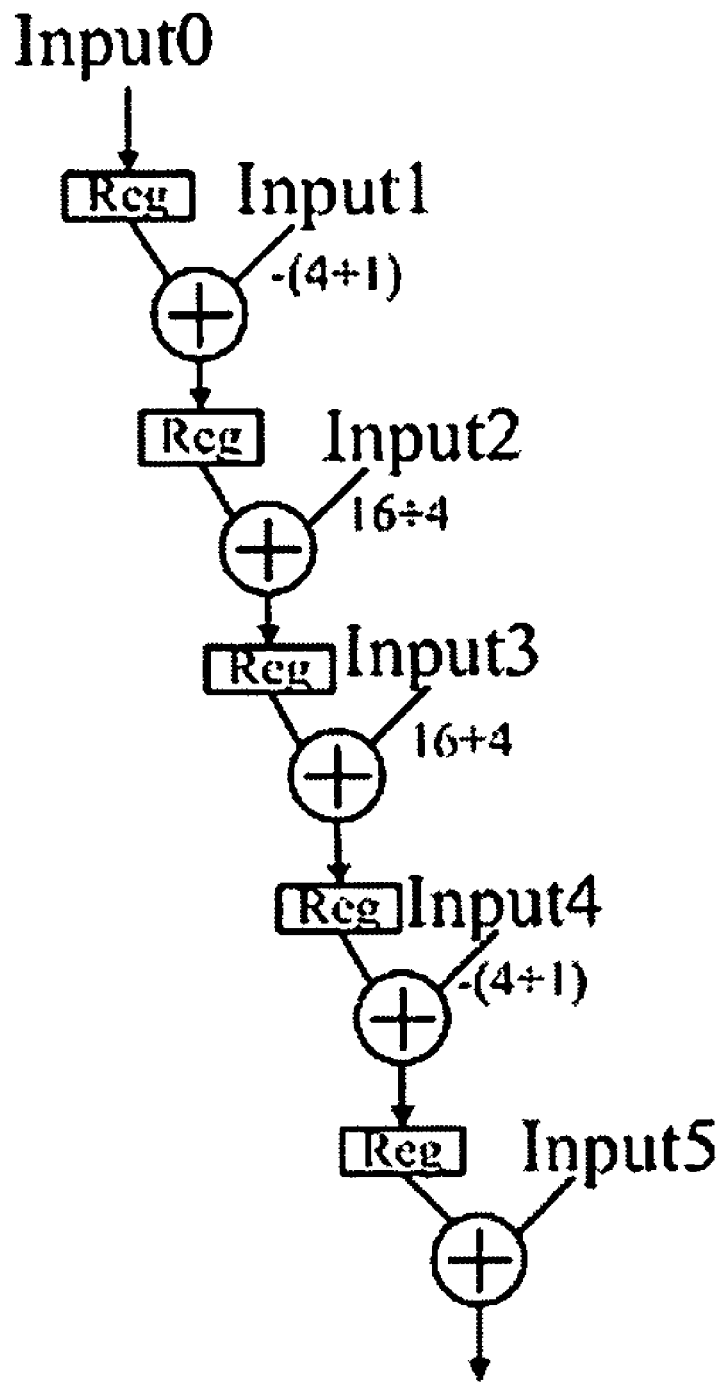
FIG. 28A is the structural view of the general 6-tap FIR filter.
Figure 28B:
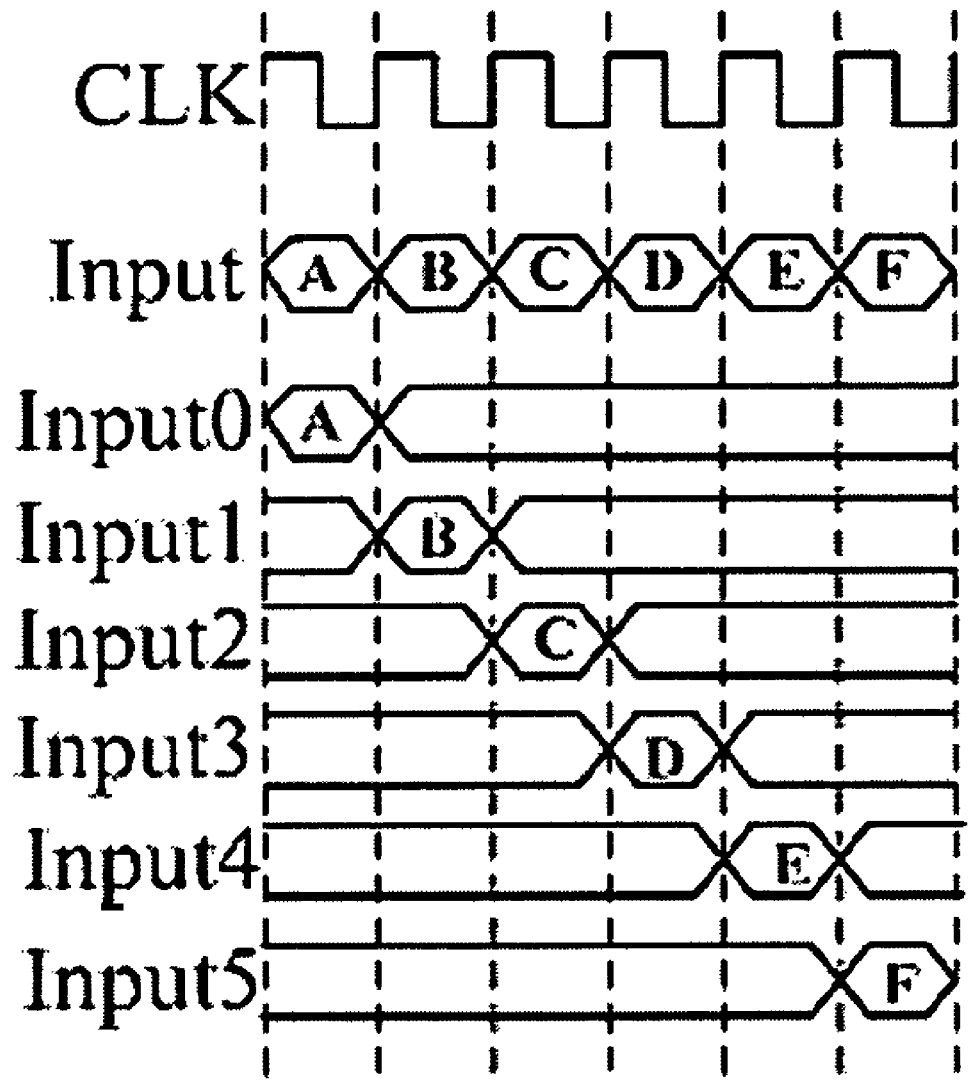
FIG. 28B is the operational view of the general 6-tap FIR filter.
Figure 29:
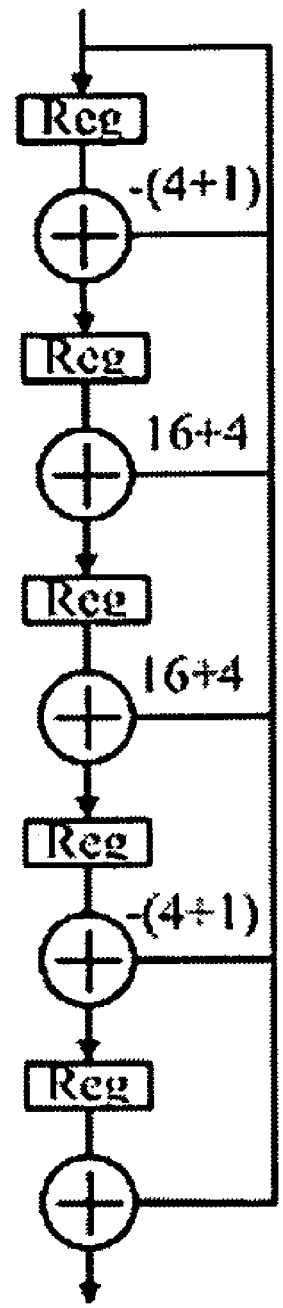
FIG. 29 is the structural view of the general broadcasting 6-tap FIR filter.

Please refer to FIG. 20 to FIG. 22, which are structural views showing a cost selector, a cost storage device and a comparator. As shown in the figures, a cost selector [35] receives MV costs from an MV cost calculator [32] in a Y-coordinate sequence of 0, −2, −1, +2 and +1 and SATDs from an SATD calculator [34]. Each valid data reception obtains costs of 5 candidate points to be stored in a first to a fifth cost storage device nh~ph [351a~355e] correspondingly. Therein, the nh, nq, l, pq and ph are corresponding to candidate points having X coordinates of −2, −1, 0, +1 and +2 (as shown in FIG. 21.) And a third storage (storage i) [3511c], a first storage (storage nh) [3511a], a second storage (storage nq) [3511b], a fifth storage (storage ph) [3511e] and a fourth storage (storage pq) [3511d] are corresponding to candidate points having Y coordinates of 0, −2, −1, +2 and +1 respectively for storing costs of the candidate points. After accumulating MV costs and SATDs of all modes, data are transferred to a first to a fifth comparators [352a~352e] in the same sequence of candidate points having Y coordinates of 0, −2, −1, +2 and +1 respectively to select best candidate points for the mode. And the selected best combination is processed with the fifth comparator [352e] for selection again. Therein, 16×16, 16×8 and 8×16 Macroblocks are grouped to choose a smallest cost as an up layer cost; then the macroblock is divided into four 8×8 macroblocks, including the upper left, the upper right, the lower-left and the lower-right sub-macroblocks. A best selection is obtained for 8×8, 8×4, 4×8 and 4×4 modes of each sub-macroblock. After modes for the upper left, the upper right, the lower-left and the lower-right sub-macroblocks are obtained sequentially, costs for the four sub-macroblocks are summed to obtain a best combination constituted of 8×8, 8×4, 4×8 and 4×4 modes, where the smallest cost is a down layer cost. At last, the up layer cost is compared with the down layer cost. If a better result is obtained, original costs are replaced to obtain a best combination for a best fractional decision for the macroblock. If not, a calculation of a next mode continues until calculations for the macroblock are all done. Therein, a flow of the comparators are recorded with its number of cycles in an accumulator [7].

To sum up, the present invention is a method of a scalable FME for a multimedia coding system, where, through a scalable FME, a picture quality is promised with a minute calculation or a simpler calculation is processed with a low power consumption for obtaining an acceptable picture quality; and a usage rate and a calculation time of a hardware is effectively improved for real-time picture compression coding with a coordination of BSTP-FME.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of a scalable fractional motion estimation (FME) for a multimedia coding system, comprising the steps of:
   (a) processing an H.264 coding to obtain a quality scalability of three quality levels and processing a scalable FME to said three quality levels; and
   (b) processing a block size trend prediction FME (BSTP-FME) to estimate required area and parallelism through one or more search ranges and obtaining a best selection according to signal-to-noise ratio (SNR) drop wherein said BSTP-FME comprises:
   controlling mode flow by receiving integer motion vectors (IMVs) to decide a flow for said IMVs;
   calculating motion vectors (MVs) by receiving said IMVs and processing motion estimations to corresponding fractional pixels to obtain MV costs;
   dual-directionally processing rotation interpolations to a plurality of the IMVs to obtain calculation data;
   calculating a sum-of-absolute-transformed-differences (SATD) by receiving said calculation data and obtaining SATDs of said corresponding fractional pixels; and
   selecting cost by receiving said MV costs and said SATDs to be accumulated and compared to obtain a best parallelism of hardware processing.

2. The method according to claim 1, wherein said quality levels are obtained by dividing results of FME into three quality levels according to characteristics required by respective usage levels, comprising:
   (i) a single mode, said single mode processing an integer motion vector (IMV);
   (ii) a concise mode, said concise mode processing a plurality of IMVs to obtain a better picture quality than that obtained through said single mode; and
   (iii) a complete mode, said complete mode processing IMVs of all block modes to obtain a best picture quality.

3. The method according to claim 1, wherein said one or more search ranges are included in a range of ±2 fractional pixels with a full search to process motion estimations to 25 fractional pixels.

4. The method according to claim 1, wherein said calculating MVs comprises referring to a reference table.

5. The method according to claim 1, wherein said calculating the SATD comprises processing 20 processing elements (PE) based on 4×4 macroblocks.

* * * * *